Figure 1:
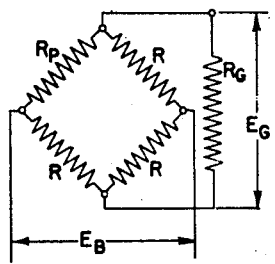

Aug. 9, 1949.  W. A. SOURWINE ET AL  2,478,720

STRAIN-STRESS COMPUTER

Filed July 20, 1944

*INVENTORS*
WILLIAM A. SOURWINE
ALEXANDER H. FLAX
BY HAMILTON M. MAYNARD

*ATTORNEY*

UNITED STATES PATENT OFFICE 2,478,720

STRAIN-STRESS COMPUTER

William A. Sourwine, North Tonawanda, and Hamilton M. Maynard, Williamsville, N. Y., and Alexander H. Flax, Philadelphia, Pa., assignors to Curtiss-Wright Corporation, a corporation of Delaware Application July 20, 1944, Serial No. 545,880

6 Claims. (Cl. 73—88.5)

This invention relates generally to apparatus for determining the magnitude of strains and stresses. More particularly, it relates to a new apparatus for determining the axial stresses and shear stresses, in a given direction.

The means of determining strains from an electrical resistance consists of mounting one resistance type strain gage on the part to be stressed and mounting another gage on a piece of similar metal for temperature compensating purposes. These two strain gages form two of the legs of a Wheatstone bridge. A direct current galvanometer is made to read zero deflection by means of the variable resistance of one of the other two legs of the bridge. The part is then stressed to any load and the resistance is changed in the working strain gage causing a bridge output. To determine the complete strain-stress picture of a portion of the structure, three strain gages are incorporated in what is known as a "rosette." Two of these gages are oriented at angles of 90 degrees to each other, and serve to measure the strain in two directions. The third strain gage is oriented at an angle of 45 degrees to the other two, and serves to measure the diagonal strain. The axial stress in two directions and the shear stress are then computed from the following three equations:

$$\sigma_X = \frac{E}{1-\mu^2}(\epsilon_X + \mu\epsilon_Y) \quad (1)$$

$$\sigma_Y = \frac{E}{1-\mu^2}(\epsilon_Y + \mu\epsilon_X) \quad (2)$$

and $$\sigma_{XY} = \frac{E}{1+\mu}\left(\epsilon_{XY} - \frac{\epsilon_X + \epsilon_Y}{2}\right) \quad (3)$$

where $\sigma_X$ and $\sigma_Y$ are the axial stresses in two directions, $\sigma_{XY}$ is the shear stress, $\mu$ is Poisson's ratio, $\epsilon_X$ and $\epsilon_Y$ are the strains in two directions at 90 degrees to each other, and $\epsilon_{XY}$ is the strain at an angle of 45 degrees to $\epsilon_X$ and $\epsilon_Y$. Hitherto, two methods have been employed for making these computations: (1) the axial stress and shear stress are manually calculated from the strain values, and (2) an electrical machine gives the maximum shear and its axis or the shear in any desired direction. However, this machine is complicated with many delicate moving parts, and must be operated after the test values of strain have been taken, as a separate operation. In many cases the maximum shear is unnecessary, as it is only necessary to know the shear along a given direction, together with the axial stresses, for comparison with stress analysis values.

It is therefore an object of the present invention to electrically compute the tensile or compressive stresses along the axes of the rosette, and to electrically compute the total shear stresses. It is another object to provide a relatively simple and inexpensive device for accomplishing this purpose. Other objects will appear hereinafter.

Figure 2:
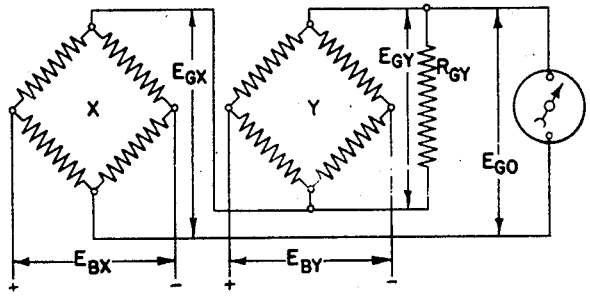
Figure 3:
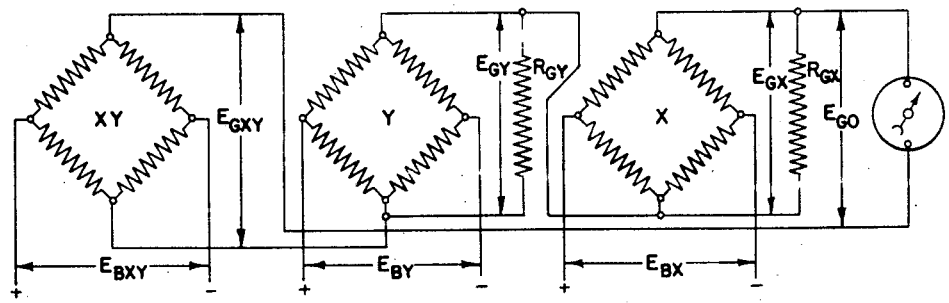
Figure 4:
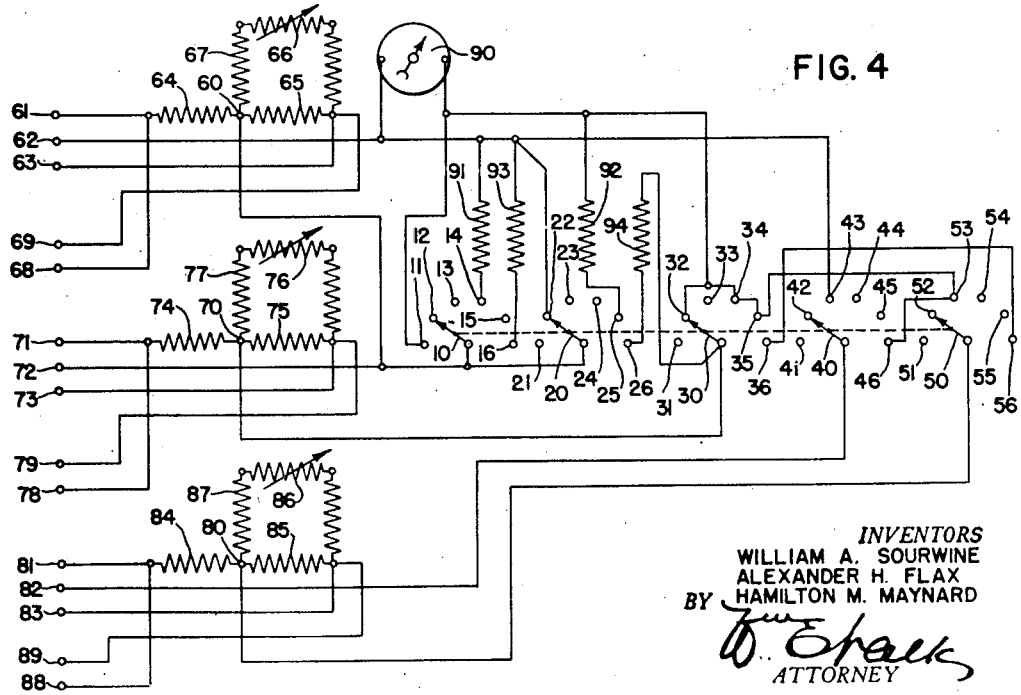

These objects are accomplished by the herein described invention, which may be more readily understood by reference to the accompanying drawings, in which Figures 1, 2 and 3 are wiring diagrams illustrating the principles of this invention. Figure 4 is a wiring diagram of a practical embodiment of this invention.

The formula for expressing the voltage developed between two opposite corners of a Wheatstone bridge can be simplified for the special case where three of the bridge arms are equal, as follows:

$$E_G = \left(\frac{E_B}{2}\right)\left(\frac{R_P - R}{R_P + R}\right)\left(\frac{R_G}{R_G + \frac{R}{2} + \frac{R_P R}{R_P + R}}\right) \quad (4)$$

where $E_B$ represents the bridge voltage, R represents the resistance of any one of the three equal bridge arms, $R_P$ is the resistance of the fourth bridge arm, $R_G$ is the total resistance connected across the bridge at the point where the unbalance voltage is measured, and $E_G$ is the bridge unbalance voltage. This circuit is shown diagrammatically in Figure 1. For the purpose of analysis let $$N = \frac{R_G}{R_G + \frac{R}{2} + \frac{R_P R}{R_P + R}} \quad (5)$$

Then:

$$E_G = \left(\frac{E_B}{2}\right)\left(\frac{\Delta R}{R_P + R}\right)N \quad (6)$$

where $\Delta R$ is the difference between $R_P$ and $R$.

It is seen that the value of the two factors, $E_B$ and $N$, are at least partially dependent upon factors external to the bridge proper, and thus may be used to alter the value of $E_G$ for any given value of $\Delta R$. It would seem that $E_B$ would be best suited for this application, since it is linearly related to $E_G$ and unaffected by $\Delta R$. In practice, however, it is difficult to control the value of $E_B$ without resorting to elaborate systems. In the case where dry cells are used, six cells would be the minimum number that would permit voltage ratios of ½ and ⅓. A voltage dividing network would produce unnecessary battery drain. On the other hand, the factor N provides a simple, yet accurate means of controlling the value of $$\frac{E_G}{R}$$

It is true that N is a function of $\Delta R$, but it will be shown that the effects of $\Delta R$ may normally be neglected.

In the conventional strain gage measuring circuit, the resistance values of the four arms of the bridge are maintained approximately equal, but with the gage arm slightly different from the remaining three arms. If $R_P$ is the resistance of the gage arm and R is the resistance of each of the remaining three arms, the value of $\Delta R$, or $R_P - R$, will be small relative to R. Over the usable range of standard strain gages, the change in $\Delta R$ with the application of strain will also be small relative to R. Under these conditions, the following approximations for Equations 5 and 6 can be formulated:

$$N = \frac{R_G}{R_G + R} \quad (7)$$

and $$E_G = \frac{E_B N \Delta R}{4R} \quad (8)$$

Thus, with constant values of $E_B$, N and R, the change of $E_G$ with $\Delta R$ is linear for all practical purposes over the usable range of the strain gage. Values of $E_G$ are those that would be read by a potentiometer type of indicator, which operates at infinite impedance (infinite value of $R_G$) at balance, when the value of N is 1. By reducing $R_G$ to a finite value, N becomes less than one. Thus, when $R_G = R$, the value of N is $\frac{1}{2}$; when $R_G = \frac{1}{2}R$, the value of N is $\frac{1}{3}$.

Referring now to Equations 1, 2 and 3, the values of the strains $\epsilon_X$, $\epsilon_Y$, and $\epsilon_{XY}$, may be measured by means of resistance type strain gages, where $\epsilon = K \Delta R$. Each strain may then be read directly in three separate bridge circuits in conventional fashion, according to Equation 6. With the same values for $E_B$ and R for all bridge circuits, the output voltage from two or more circuits may also be combined to form a composite voltage according to the equation:

$$E_{GO} = E_{GX} + E_{GY} \quad (9)$$

where the values are as shown in Figure 2. In the bridge circuit X (Figure 2), the value of $R_{GX}$ is infinite, while the value of $R_{GY}$ is finite, and so chosen that N (Equation 5) is equal to $\mu$ (Equation 1). The value of Poisson's ratio ($\mu$) ordinarily varies between $\frac{1}{3}$ and $\frac{1}{4}$, depending on the particular material under test. In the embodiment of the invention herein described, it is assumed to be $\frac{1}{3}$. The value of $R_{GY}$ is then adjusted so that N is $\frac{1}{3}$. It is then easily verified, from Equations 8 and 9, that $$E_{GO} = K_1 (\epsilon_X + \mu \epsilon_Y) \quad (10)$$

With $K_1$ equal to $$\frac{E}{1-\mu^2}$$

the value of $\sigma_X$ (Equation 1) may then be measured directly in terms of $E_{GO}$, by means of a high impedance galvanometer.

A similar circuit may be arranged to solve Equation 2. In this case the value of $R_{GY}$ becomes infinite while $R_{GX}$ is chosen so that N is $\frac{1}{3}$. For either Equation 1 or 2, the values of either $R_{GX}$ or $R_{GY}$ obviously may be appropriately changed to satisfy different values of Poisson's ratio.

In the case of Equation 3, a somewhat different arrangement (Figure 3) is necessary. In this case it is desired to subtract one-half the sum of $E_{GX}$ and $E_{GY}$ from $E_{GXY}$. By opposing the voltage output of the XY bridge to the voltage output of the X bridge and the Y bridge, and setting $R_{GX}$ and $R_{GY}$ so that N is in each case equal to $\frac{1}{2}$, it is easily seen that:

$$E_{GO} = K_3 \left( \epsilon_{XY} - \frac{\epsilon_X + \epsilon_Y}{2} \right) \quad (11)$$

With $K_3$ equal to $$\frac{E}{1+\mu}$$

the value of $\sigma_{XY}$ (Equation 3) may then be measured directly in terms of $E_{GO}$.

Thus far, the discussion has been limited to the case where three of the bridge arms are equal. It can be shown, however, that the same characteristics apply when two of the arms are increased to a value twice that of the opposite two arms. The value of the shunting resistor required to produce a value of $N = \frac{1}{3}$ and $\frac{1}{2}$ is different than that for the case of the square bridge. The computer is, therefore, equally suited for application to the case where two rosettes are mounted back to back for the purpose of eliminating bending strains.

In the event that a direct reading instrument is desired, the same principles may be extended. Since the factors $\mu$ and E are constant for a given material, the expressions $$\frac{E}{1-\mu^2}$$

and $$\frac{E}{1+\mu}$$

can be accounted for directly in the individual bridge shunt resistors. Writing Equations 1, 2 and 3 in the forms:

$$\sigma_X = \frac{E}{1-\mu^2} \epsilon_X + \frac{E}{1-\mu^2} \epsilon_Y$$

$$\sigma_Y = \frac{E}{1-\mu^2} \epsilon_X + \frac{E}{1-\mu^2} \epsilon_Y$$

$$\sigma_{XY} = \frac{E}{1+\mu} \epsilon_{XY} - \frac{E}{2(1+\mu)} \epsilon_X - \frac{E}{2(1+\mu)} \epsilon_Y$$

or letting $$\frac{1}{K} = \frac{E}{1-\mu^2},$$

$$K\sigma_X = \epsilon_X + \mu \epsilon_Y$$

$$K\sigma_Y = \mu \epsilon_X + \epsilon_Y$$

and $$K\sigma_{XY} = \epsilon_{XY}(1-\mu) - \epsilon_X \left(\frac{1-\mu}{2}\right) - \epsilon_Y \left(\frac{1-\mu}{2}\right)$$

the values of $R_{GX}$, $R_{GY}$ and $R_{GXY}$ are then set so that for Equation 1, $N_X = 1$ and $N_Y = \mu$, and similarly for the remaining equations.

In Figure 4 is illustrated a wiring diagram of a practical embodiment of the invention in which the three strains $\epsilon_X$, $\epsilon_Y$ and $\epsilon_{XY}$ and the three stresses $\sigma_X$, $\sigma_Y$ and $\sigma_{XY}$ may be read on the same galvanometer. This is accomplished by means of various switches serving to incorporate various resistances across the terminals of the three bridges used to measure the three strains. A five-decked selector switch has its movable contact arms 10, 20, 30, 40 and 50 connected to move in unison. Each contact arm is capable of making connections with six terminals, identified as terminals 11, 12, 13, 14, 15 and 16 for arm 10, terminals 21, 22, 23, 24, 25 and 26 for arm 20, terminals 31, 32, 33, 34, 35 and 36 for arm 30, terminals 41, 42, 43, 44, 45 and 46 for arm 40, and terminals 51, 52, 53, 54, 55 and 56 for arm 50. Three resistance type strain gages such as of 120 ohms each, for the measurement of spanwise strain ($\epsilon_X$), chordwise strain ($\epsilon_Y$) and diagonal (45°) strain ($\epsilon_{XY}$) are connected across gage terminals 61 and 62, 71 and 72, and 81 and 82, respectively, as shown and constitute one arm of each of the three bridges. Three temperature-compensating resistance type strain gages also of 120 ohms each, under zero strain, for the purpose of compensating for changes in resistance with changes in temperature, are connected across terminals 62 and 63, 72 and 73, and 82 and 83, respectively, and constitute the second arm of each of the three bridges. The third and fourth arms consist of fixed resistances 64 and 65 both connected to terminal 60 for the first bridge, 74, and 75 both connected to terminal 70 for the second bridge, and 84 and 85 both connected to terminal 80 for the third bridge. All these resistances have an approximate value of 120 ohms each. The bridges are balanced, or brought into a predetermined unbalance, by means of adjustable resistances 66, 76 and 86 which are in series with fixed resistances 67, 77 and 87, respectively, and are shunted around resistances 65, 75 and 85, respectively. Positive battry terminals 68, 78 and 88 and negative battery terminals 69, 79 and 89, respectively, are connected to the same or to equal batteries for the three bridges, and supply current to such bridges. They are connected to the bridge arms, including the strain gages, as shown.

In position 1 of the selector switch, it is seen that contact arm 10 is connected to terminal 11, so that the bridge output from the first bridge across terminals 60 and 62 alone is caused to pass through a galvanometer 90. Contact points 21, 31, 41 and 51 are dead-ended. In this position the strain $\epsilon_X$ may be read directly on galvanometer 90. In position 2 of the selector switch (the position shown in the drawing), contact arm 20 is connected to terminal 22 and contact arm 30 to terminal 32, so that the bridge output from the second bridge across terminals 70 and 72 alone is caused to pass through galvanometer 90. Contact points 12, 42 and 52 are dead-ended. In this position the strain $\epsilon_Y$ may be read directly on galvanometer 90. In position 3 of the selector switch, contact arm 40 is connected to terminal 43 and contact arm 50 to terminal 53, so that the bridge output from the third bridge across terminals 80 and 82 alone is caused to pass through galvanometer 90. Contact points 13, 23, and 33 are dead-ended. In this position the strain $\epsilon_{XY}$ may be read directly on galvanometer 90.

The remaining three positions of the selector switch automatically calculate and measure the stresses according to Equations 1, 2 and 3. Thus, in position 4 terminal 60 is connected to terminal 72, while terminal 62 is connected directly to one terminal of the galvanometer 90. Terminal 70 is connected to the opposite terminal of the galvanometer 90 by means of contact arm 30 and contact point 34. Across terminals 60 and 62 is connected a resistance 91 of 60 ohms, through contact arm 10 and contact point 14. Contact points 24, 44 and 54 are dead-ended. In this position the stress $\sigma_Y$ may be read on galvanometer 90.

Position 5 is analogous to position 4, except that a resistance 92 of 60 ohms is connected across terminals 70 and 72, through contact arms 20 and 30 and contact points 25 and 35, respectively, in place of resistance 91. Contact arm 30 and contact point 35 also serve to connect terminal 70 with one terminal of the galvanometer 90. Contact points 15, 45 and 55 are dead-ended. Terminal 60 is connected to terminal 72, and terminal 62 to the oppostie terminal of galvanometer 90, as in position 4. It will be seen that, in position 5, the circuit is connected exactly as in Figure 2. In this position the stress $\sigma_X$ may be read on galvanometer 90.

In position 6, terminal 62 is connected directly to one terminal of the galvanometer 90, as in positions 4 and 5. Terminal 82 is connected to the opposite terminal of galvanometer 90 through contact arm 40 and contact point 46. Terminal 80 is connected to terminal 70 through contact arms 50 and 30 and contact points 56 and 36. Terminal 72 is connected to terminal 60 as in positions 4 and 5. Across terminals 60 and 62 is connected a resistance 93 of 120 ohms through contact arm 10 and contact point 16. Across terminals 70 and 72 is connected a resistance 94 through contact arm 20 and contact point 26. It is readily seen that the circuit so outlined is exactly the same as that shown in Figure 3. In this pointion the stress $\sigma_{XY}$ may be read on galvanometer 90.

It is obvious that many changes may be made from the above description without departing from the spirit of the invention. It is to be understood, therefore, that the invention is not to be limited except as defined in the appended claims.

We claim:

1. An electrical network for measuring and computing axial stress from electrically measured strains, comprising, a pair of Wheatstone bridges each arranged to contain as an arm thereof a resistor whose resistance varies directly in proportion to a strain, a pair of input terminals in each of said bridges for connection to a potential source, the resistance values of each of the arms of said bridges being substantially equal to each other, a pair of output terminals in each of said bridges, an electrical measuring instrument, a connection from one said output terminal of one of said bridges to one terminal of said instrument, a connection from the opposite said output terminal of the other of said bridges to the other terminal of said instrument, a connection between the other two said output terminals, and a shunting resistor across said output terminals of one of said bridges, the resistance of said shunting resistor being substantially one-half the resistance of an arm of a said bridge.

2. An electrical network for measuring and computing shear stress from electrically measured strains comprising three Wheatstone bridges each arranged to contain as an arm thereof a resistor whose resistance varies directly in proportion to a strain, a pair of input terminals in each of said bridges for connection to a potential source, the resistances of each of the arms of said bridges being substantially equal to each other, a pair of output terminals in each of said bridges, an electrical measuring instrument, a connection from one said output terminal of the first said bridge to one terminal of said instrument, a connection from the corresponding said output terminal of the third said bridge to the other terminal of said instrument, a connection between the corresponding terminal of the second said bridge to the opposite terminal in said first bridge, a connection between the two remaining said output terminals, and a pair of shunting resistors across said output terminals of each of said first two bridges, the resistance of each of said shunting resistors being substantially equal to the resistance of an arm of one of said bridges.

3. An electrical network for measuring and computing strains and stresses from electrically measured strains, comprising three Wheatstone bridges each arranged to contain as an arm thereof a resistor whose resistance varies directly in proportion to a strain, a pair of input terminals in each of said bridges for connection to a potential source, the resistances of each of the arms of said bridges being substantially equal to each other, a pair of output terminals in each of said bridges, a first pair of shunting resistors across said output terminals of said first and second bridges, a second pair of shunting resistors across said output terminals of said first and second bridges, the resistance of each resistor of said first pair being substantially one-half the resistance of an arm of a said bridge and of said second pair being substantially equal to the resistance of an arm of a said bridge, an electrical measuring instrument, and selector switch means for connecting, selectively: said output terminals of any of said bridges separately to the terminals of said measuring instrument; or each member of said first pair of shunting resistors separately to its associated bridge, two opposite said output terminals of said first and second bridges to the terminals of said measuring instrument, and the two remaining terminals of said first and second bridges to each other; or each member of said second pair of shunting resistors together to its associated bridge, the corresponding said output terminals of said first and third bridges to the terminals of said measuring instrument, the corresponding said output terminal of said second bridge to the opposite said output terminal of said first bridge, and the two remaining terminals of said second and third bridges to each other.

4. An electrical network for measuring and computing stresses from electrically measured strains, comprising a plurality of Wheatstone bridges each arranged to contain as an arm thereof a resistor whose resistance varies directly in proportion to a strain, a pair of input terminals in each of said bridges for connection to a potential source, a pair of output terminals in each of said bridges, an electrical measuring instrument, said instrument being connected across one output terminal of one bridge and one output terminal of the other bridge, a connection between the remaining two bridge output terminals, and a shunting resistor across the output terminals of one of the bridges.

5. An electrical network for measuring and computing shear stresses from electrically measured strains, comprising three Wheatstone bridges each arranged to contain as an arm thereof a resistor whose resistance varies directly in proportion to a strain, a pair of input terminals in each of said bridges for connection to a potential source, a pair of output terminals in each of said bridges, an electrical measuring instrument, said instrument being connected across one output terminal of one bridge and an output terminal of another bridge, the remaining two output terminals of the last mentioned two bridges being connected respectively to the two output terminals of the third bridge, and shunting resistors across the output terminals of each of two of the bridges.

6. An electrical network for measuring and computing stresses from electrically measured strains, comprising a pair of Wheatstone bridges each arranged to contain as an arm thereof a resistor whose resistance varies directly in proportion to a strain, each bridge having input terminals for connection to a source of electrical energy and output terminals, a shunt resistor for each bridge, an electrical measuring instrument, and switch means for connecting, selectively: the instrument across the output terminals of one bridge; or the instrument across the output terminals of the other bridge; or the instrument across one output terminal of said one bridge and one output terminal of said other bridge, the remaining two bridge output terminals to each other, and the shunt resistor of said one bridge across the output terminals thereof; or the instrument across one output terminal of said one bridge and one output terminal of said other bridge, the remaining two bridge output terminals to each other, and the shunt resistor of said other bridge across the output terminals thereof.

WILLIAM A. SOURWINE.
HAMILTON M. MAYNARD.
ALEXANDER H. FLAX.

REFERENCES CITED

The following references are of record in the file of this patent:

UNITED STATES PATENTS

| Number | Name | Date |
|---|---|---|
| 1,493,586 | Wood | May 13, 1924 |
| 1,494,586 | Cary | May 20, 1924 |
| 1,912,242 | Albert | May 30, 1933 |
| 2,128,257 | Yuk-Wing Lee et al. | Aug. 30, 1938 |
| 2,246,575 | Coleman | June 24, 1941 |
| 2,318,102 | Ruge | May 4, 1943 |

FOREIGN PATENTS

| Number | Country | Date |
|---|---|---|
| 11,765 | Great Britain | 1902 |

OTHER REFERENCES

"Characteristics and aircraft applications of wire resistance strain gages," article by A. V. de Forest, Instruments, vol. 15, April, 1942, pp. 112, 113, 114, 136, and 137.

"Applications of the electric strain gage," article in Automotive and Aviation Industries, Dec. 15, 1942, pp. 40, 41, 42, and 46.

"A radio flight-test recorder," article in Aircraft Engineering, June, 1943, pp. 174 through 177.